April 9, 1963     J. E. BASS, JR     3,085,219
IMPROVED COMPOSITE FLUID AND ELECTRICAL COUPLING
Filed June 2, 1960     2 Sheets-Sheet 1
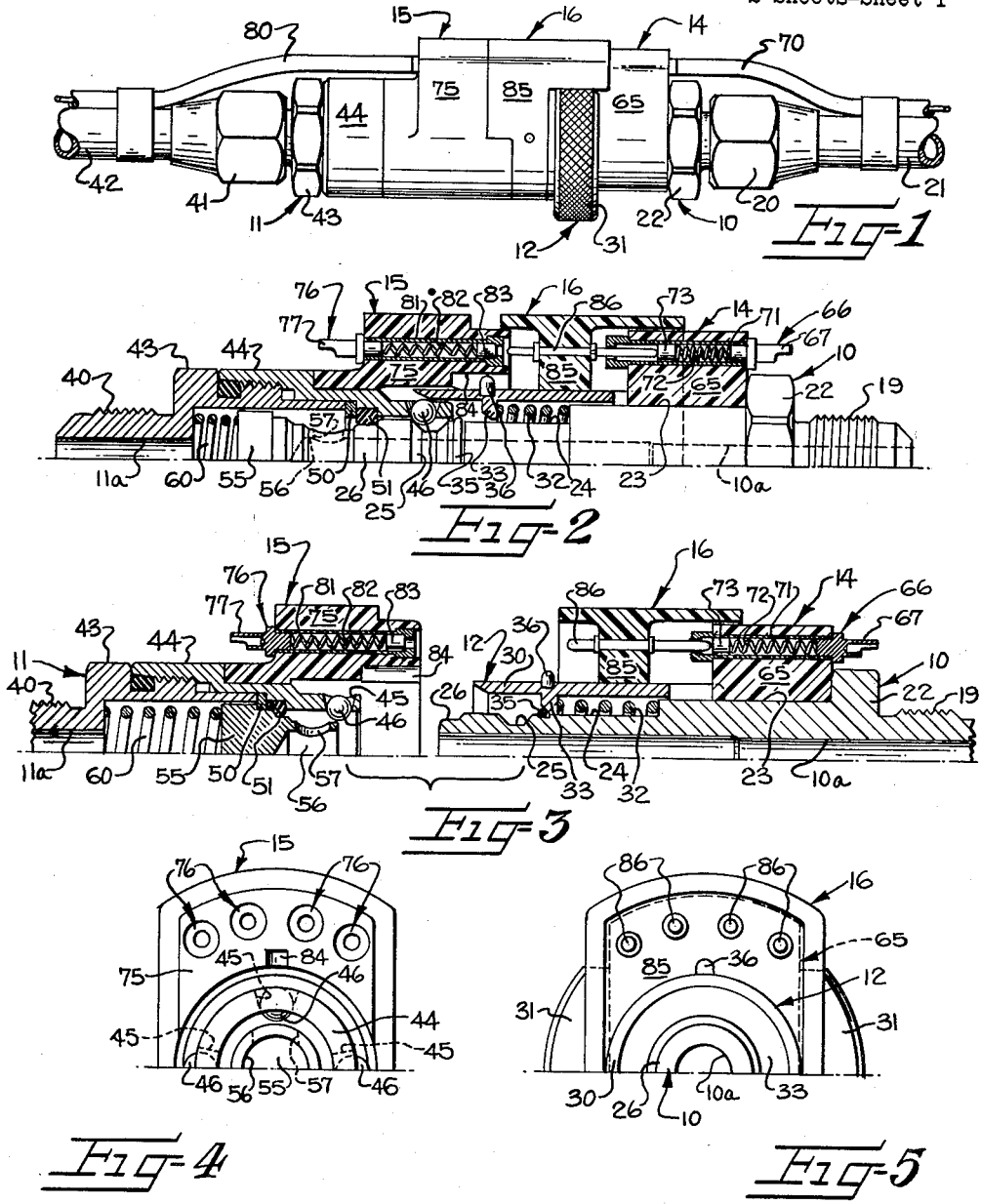
INVENTOR:
JOHN E. BASS, JR.
BY *Eaton, Bell, Hunt & Seltzer*
ATTORNEYS April 9, 1963   J. E. BASS, JR   3,085,219
IMPROVED COMPOSITE FLUID AND ELECTRICAL COUPLING
Filed June 2, 1960   2 Sheets-Sheet 2

INVENTOR:
JOHN E. BASS, JR.

BY Eaton, Bell, Hunt & Seltzer
ATTORNEYS

United States Patent Office 3,085,219
Patented Apr. 9, 1963

3,085,219
IMPROVED COMPOSITE FLUID AND ELECTRICAL
COUPLING
John E. Bass, Jr., Charlotte, N.C., assignor to Perfecting
Service Company, Charlotte, N.C., a corporation of
North Carolina
Filed June 2, 1960, Ser. No. 33,496
4 Claims. (Cl. 339—15)

This invention relates generally to quick-disconnect couplings of the type which are adapted to complete a fluid coupling and an electrical circuit when the two main parts of the coupling are joined together. More particularly, the present invention relates to an improved composite coupling in which the coupling parts are arranged in such a manner that the electrical circuit must be disconnected prior to the uncoupling of the fluid coupling to thereby insure safety of operation when an explosive and/or volatile fluid is passed through the fluid coupling.

The composite fluid and electrical coupling of the present invention is an improvement of the fluid and electrical coupling shown and described in the co-pending application of Paul H. Poetzsch et al., filed September 29, 1958, Serial No. 764,137.

Composite fluid and electrical couplings of the quick-disconnect type are finding increasing uses in many fields, one of which is the field of aeronautics. High altitude flying necessitates the use of oxygen breathing equipment for aircraft pilots in addition to the usual electrically operated appliances, such as earphones, microphones, radios or other electrical instruments, so much a part of modern-day flying techniques.

The use of a composite coupling, particularly when the fluid carried by the fluid conduit is volatile and/or explosive, may cause a fire and/or explosion if the electrical connection is not completely broken before the fluid connection is broken. In the above-noted co-pending application, several forms of composite couplings are illustrated and in each form the electrical circuit is broken prior to the breaking of the fluid coupling. However, in each of the composite couplings of the above-noted co-pending application, an electrical coupling member is carried by each fluid joint member and when the electrical coupling members are separated to break the electrical connection, the electrical conductor wires associated with one of the electrical coupling members are bent or flexed each time the composite coupling is uncoupled. Therefore, the useful life of the composite coupling may be shortened by breakage of the electrical wires after continued flexing. Moreover, after uncoupling the composite coupling, the electrical wires associated with the electrical coupling member carried by one of the fluid joint members of the composite coupling are kinked or bent along their length. Upon attempting to again connect the composite coupling, the kinked electrical wires create a frictional drag as they are straightened by the operational movement of a coupling element carrying the electrical coupling member associated with the kinked wires therewith which is required to connect the composite coupling thereby rendering such movement difficult.

With the foregoing in mind, it is a principal object of the present invention to provide an improved composite coupling in which the electrical conductor wires are secured to electrical sockets which are in turn rigidly secured to the fluid joint members to prevent any relative movement between the wires and the electrical sockets and thereby prevent flexing and breaking of the wires as well as loosening of the connection between the wires and sockets.

It is another object of the present invention to provide a composite coupling of the type described in which an electrical connector is positioned between electrical sockets rigidly secured to the fluid joint members and the intermediate electrical connector may be manually moved to disconnect or break the electrical circuit between the two electrical sockets prior to breaking of the fluid coupling between the fluid joint members.

It is a more specific object of this invention to provide an improved composite fluid and electrical coupling wherein the fluid coupling includes separable plug and socket joint members which are releasably held in telescoped relationship by detent means therebetween and wherein the electrical coupling includes an electrical socket unit fixed on each of the plug and socket joint members with an intermediate electrical connector positioned between the electrical socket units to complete an electrical circuit from one electrical socket unit to the other when the plug and socket joint members are held in telescoped relationship by the detent means. The detent means is controlled by a detent actuator which is carried by the fluid plug joint member to normally confine the detent means in locked position and retain the plug and socket joint members in fully telescoped relationship but which actuator may be manually moved to move the intermediate electrical connector and break the electrical connection between the electrical socket units before releasing the detent means in order to subsequently break the fluid coupling between the plug and socket joint members.

Some of the objects of the invention having been stated, other objects will appear as the description proceeds when taken in connection with the acompanying drawings, in which—

FIGURE 1 is an elevational view illustrating the composite coupling embodying the present invention;

FIGURE 2 is an enlarged fragmentary longitudinal sectional view through the upper portion of the composite coupling and illustrating the position of the parts when the electrical circuit has been broken by manual movement of the intermediate electrical connector while the fluid coupling remains intact;

FIGURE 3 is a view similar to FIGURE 2 and showing the two main parts of the composite coupling separated;

FIGURE 4 is an enlarged fragmentary elevational view looking at the inner end of the composite coupling part shown in the left-hand portion of FIGURE 3;

FIGURE 5 is an enlarged fragmentary elevational view looking at the inner end of the composite coupling part shown in the right-hand portion of FIGURE 3;

Figure 6:
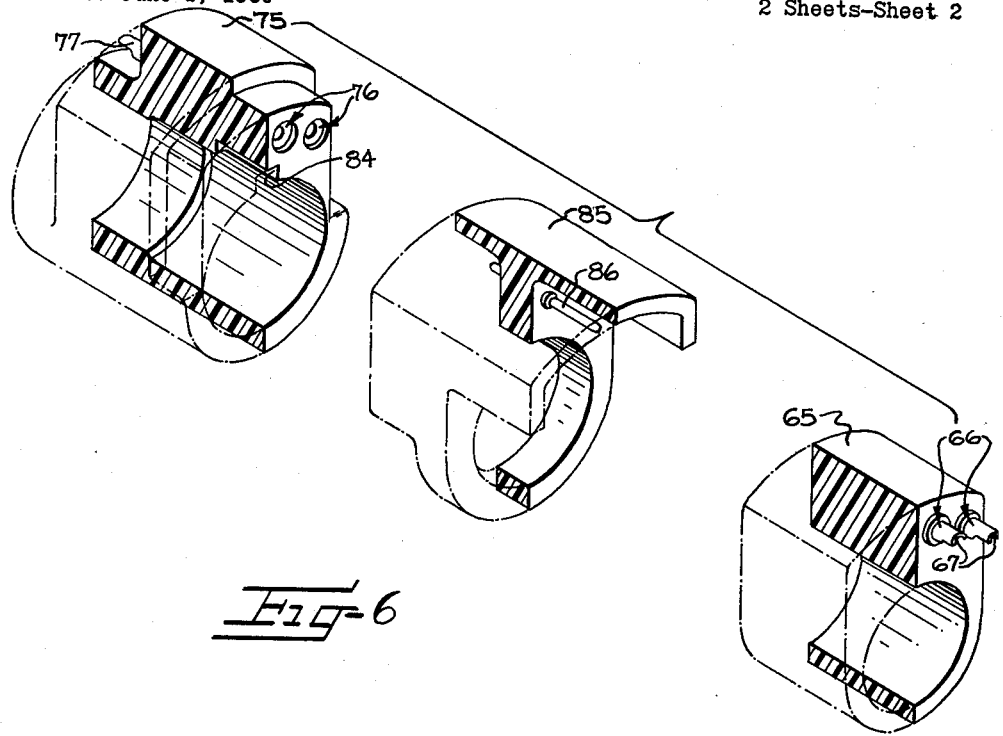
FIGURE 6 is a somewhat schematic perspective view of the electrical coupling components as removed from the fluid coupling members with parts of the electrical coupling components being shown in cross-section and with other parts of the components being shown in phantom lines.

Referring to the drawings, it will be noted that the composite coupling includes fluid coupling means which comprises a pair of tubular coupling members broadly indicated at 10 and 11 as well as a fluid coupling actuator or locking element broadly indicated at 12. The composite coupling also includes electrical coupling means which comprises electrical sockets 14 and 15 which are fixed to the respective tubular coupling members 10 and 11 and an intermediate electrical connector broadly indicated at 16 which is fixedly secured to the coupling actuator or locking element 12.

It will be noted in FIGURE 3 that the tubular coupling member 10, the coupling locking element 12, the electric socket 14 and the electric connector 16 define one component part of the composite coupling while the other tubular coupling member 11 and the electric socket 15 define the other component part of the composite coupling. The tubular coupling member 10 may be termed a plug or male joint member which is adapted to be telescopically received in the end of the other tubular coupling member 11, which may be termed a socket or female joint member.

*Fluid Coupling*

The outer end of the plug joint member 10 is threaded as at 19 (FIGURE 2) to receive a tube fitting 20 (FIGURE 1) which connects the outer end of the plug joint member 10 to one end of a fluid carrying tube 21. The plug joint member 10 is provided with an internal bore 10a which extends longitudinally thereof and an enlarged wrench engaging collar 22. It will be noted that the plug joint member 10 is cylindrical and is of stepped configuration having cylindrical portions 23 and 24 which are of progressively decreasing diameter. The cylindrical portion 24 is provided with an annular groove 25 having radially outwardly diverging side walls.

Figure 7:
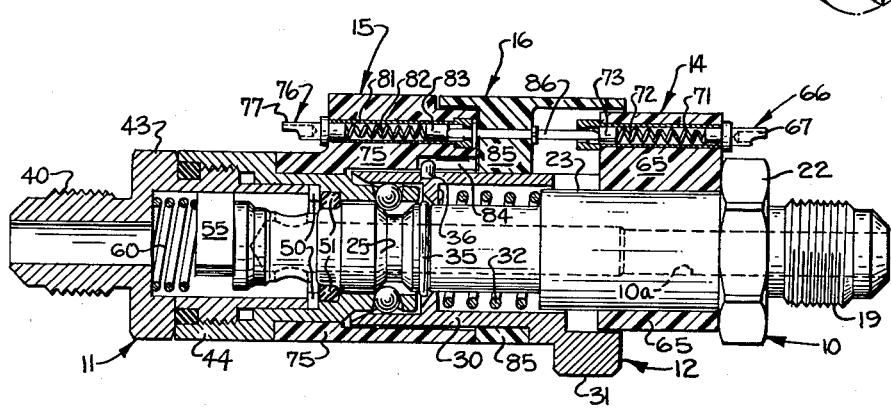
FIGURE 7 is an enlarged longitudinal sectional view through the composite coupling shown in FIGURE 1, illustrating the position of the parts when the electrical and fluid couplings are both completed.

The inner end of the plug joint member 10 is provided with a reduced portion 26 which is adapted to seat against fluid sealing means when the coupling members 10 and 11 are joined together in telescopic relationship, in a manner to be later described. The plug joint member 10 carries the axially movable actuator or locking means 12 which includes a sleeve 30 having an enlarged collar 31 formed integral with the outer end thereof and extending outwardly and downwardly therefrom (FIGURES 1, 5 and 7). The annular cylindrical sleeve 30 is normally urged toward the socket joint member 11 by a compression spring 32 which surounds the cylindrical portion 24 of the plug joint member 10 and bears against an inwardly projecting ring 33 formed integral with the sleeve 30. The spring 32 urges the ring 33 into engagement with a stop ring 35 which is positioned in an annular groove formed in the cylindrical portion 24 of the plug joint member 10.

When the coupling members 10 and 11 are separated, as shown in FIGURE 3, the spring 32 urges the sleeve 30 toward the free or inner end of the plug joint member 10 so that the ring 33 engages the ring 35 to stop movement of the sleeve 30. When the collar 31 is grasped by an operator and moved to the right in FIGURES 1 and 7, the spring 32 will be compressed and the sleeve 30 may be moved to substantially the position shown in FIGURE 2. The upper portion of the sleeve 30 is provided with a guide pin 36 (FIGURE 3) which is suitably secured in the periphery thereof.

The outer end of the socket joint member 11 is threaded as at 40 (FIGURE 2) to receive a tube fitting 41 which connects one end of a supply tube 42 (FIGURE 1) thereto. The socket joint member 11 has an enlarged wrench engaging collar 43 and an internal bore 11a which is enlarged at its inner end. A shell 44 is threadably secured on the socket joint member 11 and the outer portion of the shell 44 is of stepped configuration, having cylindrical portions of progressively decreasing diameter.

A plurality of pockets 45 (FIGURE 3) are formed in the smallest cylindrical portion of the shell 44 and the pockets 45 are adapted to receive corresponding detent balls 46. An annular washer 50 (FIGURE 3) is held in position between the inner end of the socket joint member 11 and an internal shoulder of the shell 44 to provide a seat for a resilient ring washer or seal 51, which may be a rubber O-ring.

The socket joint member 11 is provided with an internal valve member 55 having a central axial bore 56, open only in the direction of the inner end of the socket joint member 11 and a plurality of radial ports 57 providing communication between the axial bore 56 and the interior of the socket joint member 11. The valve member 55 is normally urged axially by a compression spring 60 positioned within the bore 11a and bearing against the end of the valve member 55 to normally urge the valve member 55 into sealing engagement with the resilient O-ring 51, as shown in FIGURE 3. When the plug and socket joint members 10 and 11 are disconnected, as shown in FIGURE 3, the spring 60 will urge the valve member 55 into sealing engagement with the O-ring 51 to thus prevent any leakage of oxygen from the socket joint member 11.

In order to disconnect the plug and socket joint members 10 and 11, the operator must first move the actuator means 12 to the right in FIGURE 7, thus freeing the detent balls 46 so that they will move outwardly in a radial direction and release the plug joint member 10. As the plug joint member 10 is removed, the compression spring 60 will move the valve member 55 to the closed position shown in FIGURE 3.

The fluid coupling members heretofore described are substantially the same as the fluid coupling members shown and described in the earlier mentioned co-pending application. In both applications, the fluid coupling portion of the composite coupling includes a plug joint member, a socket joint member, detent means for locking the same together, and a detent actuator which is movable axially relative to the plug and socket joint members to unlock the detent means and permit separation of the plug and socket joint members.

*Electrical Coupling*

The electrical socket 14 includes a housing 65, the lower portion of which surrounds and is fixedly secured to the cylindrical portion 23 of the plug joint member 10 in any suitable manner. It will be noted in FIGURE 6 that the housing 65 is formed of insulation material and the upper portion thereof is thickened and extends upwardly above the plug joint member 10 to fixedly support a plurality of identical electric socket or female terminals broadly indicated at 66. Each of the socket terminals 66 is provided with a plug connector 67 which is adapted to receive an end of one of a plurality of electric conductor wires 70 (FIGURE 1), the other ends of which are suitably connected to an electric appliance, such as earphones or the like.

The plug connector 67 is fixedly secured in one end of an electric conductor tube 71 (FIGURE 3) which is in turn fixed in and extends through the housing 65. The other end of the tube 71 is enlarged and is provided with an opening adapted to loosely receive the end of an electric contact member, to be later described. The tube 71 supports a compression spring 72 of electrically conductive material, one end of which bears against the plug connector 67 and the other end of which bears against an electric socket slide 73 mounted for longitudinal sliding movement inside of the tube 71.

The electric socket 15 includes a housing 75 (FIGURE 6) which is formed of insulation material and which surrounds and is fixedly secured in any suitable manner to the shell 44 of the socket joint member 11 (FIGURES 2, 3 and 7). The housing 75 is thickened and extends upwardly above the socket joint member 11 to fixedly support a plurality of identical electric socket or female terminals broadly indicated at 76 which are positioned in longitudinal alinement with the socket terminals 66 in the electric socket 14.

Each of the socket terminals 76 includes a plug connector 77 which is adapted to receive an end of one of a plurality of electric conductor wires 80 (FIGURE 1), the other ends of which lead to any suitable source of electrical energy to operate the electric appliances connected to the wires 70.

The plug connector 77 is fixedly secured in one end of an electric conductor tube 81 which is in turn fixed in and extends through the housing 75 to terminate in an enlarged end portion which is set in the housing 75. The tube 81 supports a compression spring 82 of electrically conductive material, one end of which bears against the plug connector 77 and the other end of which bears against an electric socket slide 83 (FIGURE 3).

The slide 83 is mounted for longitudinal sliding movement inside of the tube 81 and the inner end of the tube 81 is provided with an opening which is adapted to loosely receive an electric contact member, to be later described. It will be noted in FIGURES 3 and 6 that the housing 75 of the electric socket 15 is provided with a keyway 84 which is adapted to receive the pin 36 extending upwardly from the sleeve 30 of the actuator or locking means 12 to aline the parts when the plug and socket joint members 10 and 11 are joined together.

The electric connector 16 includes a housing 85 (FIGURE 6) which is formed of insulation material and which surrounds and is fixedly secured to the sleeve 30 of the actuator or locking means 12. It will be noted that the upper portion of the housing 85 is thickened and extends upwardly above the sleeve 30 to fixedly support a plurality of electrical contact pins 86, which may be termed male pins. The pins 86 project outwardly from either side of the main portion of the housing 85 and are positioned in alinement with corresponding electric socket terminals 66 and 76 supported in the respective electric socket members 14 and 15. The upper portion of the housing 85 is provided with outwardly extending portions which mate with and overlie portions of the electric socket members 14 and 15. It will be noted that the electric connector 16 is secured to the actuator or locking means 12 and any longitudinal movement of the locking or actuator means 12 will also be imparted to the electrical connector 16.

*Operation*

With the parts in assembled position, as shown in FIGURE 7, it will be noted that a fluid-tight fluid coupling is completed between the plug joint member 10 and socket joint member 11 and the electrical connector 16 completes the electrical circuit between the electric socket 14 and the electric socket 15, which are carried by the respective plug and socket joint members 10 and 11. The actuator means 12 prevents separation of the plug joint member 10 and the socket joint member 11 since it retains the balls 46 in the groove 25 of the plug joint member 10.

When it is desired to separate the plug joint member 10 from the socket joint member 11 and thus break the fluid coupling and the electrical circuit, the operator must first move the enlarged collar 31 of the actuator means 12 to the right in FIGURES 1 and 7 to substantially the position shown in FIGURE 2 to thereby shift the sleeve 30 axially until the free end thereof moves far enough to allow the detent balls 46 to move outwardly from the groove 25 in the plug joint member 10. It will be noted in FIGURE 2 that by the time the sleeve 30 is moved far enough to release the balls 46, the left-hand ends of the contact pins 86 will have moved out of contact with the electric socket terminals 76 corresponding thereto to thus break the electrical circuit completed by the electrical coupling between the wires 70 and 80 prior to breaking the fluid seal between the plug joint member 10 and socket joint member 11. Therefore, if any spark should occur during the separation of the contact pins 86 and the socket terminals 76, the spark will be dissipated before there can possibly be any escape of flammable fluid, such as oxygen, from the fluid coupling.

It will be noted that when the actuator means and sleeve 30 are moved to the right from the position shown in FIGURE 7 to the position shown in FIGURE 2, the right-hand ends of the contact pins 86 move further into the tubes 71 of the socket terminals 66 to compress the springs 72 and move the electric socket slides 73 to the right. During this movement, the opposite ends of the electric contact pins 86 move out of the openings in the ends of the tubes 81 of the socket terminals 76 and the electrical coupling between the contact pins 86 and the socket terminals 76 will be broken when the ends of the contact pins 86 move out of engagement with the electric socket slides 83. As is evident in FIGURE 2, the electrical coupling must be broken prior to breaking the fluid coupling seal between the fluid coupling members 10 and 11.

The compression springs 72 and 82 permit the use of over-size openings in the tubes 71 and 81, respectively, for loosely receiving the pins 86 projecting from the opposite sides of the housing 85 in that the electric socket slides 73 and 83 are biased by the springs 72 and 82 against the pins 86 when the composite coupling is intact to complete the electrical circuit. In this way, manufacturing difficulties in attempting to obtain perfect alinement of the plurality of pins 86 with the openings in the socket terminals 66 and 76 are overcome, inasmuch as the over-size openings will allow a limited degree of misalinement between the pins 86 and such openings. This is particularly important in the movement of the electric connector 16 to insert the pins 86 in the openings provided by the female electric socket terminals 76 and the withdrawal of the pins 86 from such openings.

In addition, the compression spring 72 in the tube 71 of each socket terminal 66 exerts a biasing force against the electric socket slide 73 which is sufficient to overcome any tendency of the electric socket slide 73 to cock or bind in the tube 71, the spring 72 also continually urging the corresponding pin 86 outwardly of the tube 71 to substantially eliminate any frictional drag on the movement of the actuator means 12 as required.

In the composite fluid and electrical coupling shown and disclosed in the present application, the socket members 14 and 15 are fixed on the fluid coupling members 10 and 11 so that the wires 70 and 80 which are connected to the socket members 14 and 15, respectively, are not flexed each time the socket members 14 and 15 are disconnected. Although the electrical coupling shown is adapted to connect two sets of four electrical conductor wires, it is to be understood that a greater or lesser number of conductor wires could be connected by the electrical coupling, if desired.

In the drawings and specification there has been set forth a preferred embodiment of the invention and, although specific terms are employed, they are used in a generic and descriptive sense only and not for purposes of limitation, the scope of the invention being defined in the claims.

I claim:
1. A composite coupling including a fluid coupling and an electrical circuit-making connection, said fluid coupling comprising matingly connected plug and socket joint members, detent means between said plug and socket joint members releasably locking said plug and socket joint members in fluid-tight mating relationship, and actuator means carried by one of said plug and socket joint members to confine said detent means in locked position and movable to effect the release of said detent means from locked position; said electrical connection comprising an electrical socket member fixed on each of said plug and socket joint members, each of said electrical socket members comprising an insulating housing and at least one socket terminal carried by said insulating housing, an electrical connector positioned between said electrical socket members, said electrical connector comprising an insulating housing and at least one electrical connector pin carried by the insulating housing of said electrical connector, and said pin extending outwardly from each side of the insulating housing of said electrical connector into reception within the socket terminals of said electrical socket members on opposite sides of said electrical connector to interconnect said electrical socket members and said electrical connector for completing the electrical connection when said plug and socket joint members are releasably locked in fluid-tight mating relationship; the insulating housing of said electrical connector being fixed on the outer surface of said actuator means and being disposed radially outwardly with respect thereto, the insulating housings of said electrical socket members being respectively fixed on the outer surfaces of said plug and socket joint members and being disposed radially outwardly with respect thereto, said pin carried by the insulating housing of said electrical connector being withdrawn from the socket terminal of one electrical socket member for breaking the electrical connection in response to movement of said actuator means in a direction releasing said detent means from confinement in a position locking said plug and socket joint members in fluid-tight mating relationship, and said plug and socket joint members being subsequently separable to break the fluid coupling formed therebetween.

2. A composite coupling as defined in claim 1, wherein the insulating housing of said electrical connector is provided with an outwardly extending integrally formed portion on each side thereof, and said outwardly extending integrally formed portions on the insulating housing of said electrical connector respectively overlying a portion of the insulating housing of the electrical socket member corresponding thereto.

3. A composite coupling including a fluid coupling and an electrical circuit-making connection, said fluid coupling comprising matingly connected plug and socket joint members, detent means between said plug and socket joint members releasably locking said plug and socket joint members in fluid-tight mating relationship, and actuator means carried by one of said plug and socket joint members to confine said detent means in locked position and movable to effect the release of said detent means from locked position; said electrical connection comprising an electrical socket member fixed on each of said plug and socket joint members, at least one socket terminal carried by each of said electrical socket members and including a tube fixed in the electrical socket member corresponding thereto, electrical connector means fixed in one end of said tube, a socket slide positioned for longitudinal movement inside of said tube, and resilient means normally urging said socket slide to the other end of said tube, and an electrical connector positioned between said electrical socket members, the other ends of said tubes of the respective electrical socket members being proximally related to dispose the socket slides of the respective electrical socket members in opposing relation to opposite sides of said electrical connector interposed between said electrical socket members, at least one electrical connector pin carried by said electrical connector, the opposite ends of said pin extending into the respective other end of said tube of the electrical socket member corresponding thereto and engaging said socket slide in said tube to interconnect said electrical socket members and said electrical connector for completing the electrical connection when said plug and socket joint members are releasably locked in fluid-tight mating relationship; said electrical connector being fixed on said actuator means and movable therewith, said pin carried by said electrical connector being withdrawn from the tube and from engagement with the socket slide in the tube of one of said electrical socket members for breaking the electrical connection in response to movement of said actuator means in a direction releasing said detent means from confinement in a position locking said plug and socket joint members in fluid-tight mating relationship, and said plug and socket joint members being subsequently separable to break the fluid coupling formed therebetween.

4. A composite coupling including a fluid coupling and an electrical circuit-making connection, said fluid coupling comprising matingly connected plug and socket joint members, detent means between said plug and socket joint members releasably locking said plug and socket joint members in fluid-tight mating relationship, and actuator means carried by one of said plug and socket joint members to confine said detent means in locked position and movable to effect the release of said detent means from locked position; said electrical connection comprising an electrical socket member fixed on each of said plug and socket joint members, each of said electrical socket members comprising an insulating housing and at least one socket terminal carried by said insulating housing, said socket terminal including a tube fixed in the insulating housing of said electrical socket member, electrical connector means fixed in one end of said tube, a socket slide positioned for longitudinal movement inside of said tube, and an electrically conductive spring positioned within said tube between said electrical connector means and said socket slide and urging said socket slide to the other end of said tube, an electrical connector positioned between said electrical socket members, said electrical connector comprising an insulating housing, the other ends of said tubes of the respective electrical socket members being proximally related to dispose the socket slides of the respective electrical socket members in opposing relation to opposite sides of the insulating housing of said electrical connector interposed between the insulating housings of said electrical socket members, at least one electrical connector pin carried by the insulating housing of said electrical connector, the opposite ends of said pin extending outwardly from the opposite sides of the insulating housing of said electrical connector into the respective other end of said tube of the electrical socket member corresponding thereto and engaging said socket slide in said tube to interconnect said electrical socket members and said electrical connector for completing the electrical connection when said plug and socket joint members are releasably locked in fluid-tight mating relationship; the insulating housing of said electrical connector being fixed on the outer surface of said actuator means and being disposed radially outwardly with respect thereto, the insulating housings of said electrical socket members being respectively fixed on the outer surfaces of said plug and socket joint members and being disposed radially outwardly with respect thereto, said pin carried by the insulating housing of said electrical connector being withdrawn from the tube and from engagement with the socket slide in the tube of one of said electrical socket members for breaking the electrical connection in response to movement of said actuator means in a direction releasing said detent means from confinement in a position locking said plug and socket joint members in fluid-tight mating relationship, and said plug and socket joint members being subsequently separable to break the fluid coupling formed therebetween.

References Cited in the file of this patent

UNITED STATES PATENTS

| | | |
|---|---|---|
| 1,433,397 | Meyer | Oct. 24, 1922 |
| 2,109,511 | Simon | Mar. 1, 1938 |
| 2,492,449 | Tuller et al. | Dec. 27, 1949 |
| 2,631,185 | Earle et al. | Mar. 10, 1953 |
| 2,724,093 | Preston | Nov. 15, 1955 |
| 2,859,422 | Oliveau | Nov. 4, 1958 |